(12) United States Patent
Lichtenau et al.

(10) Patent No.: US 11,663,270 B2
(45) Date of Patent: *May 30, 2023

(54) VECTOR STRING SEARCH INSTRUCTION

(71) Applicant: INTERNATIONAL BUSINESS MACHINES CORPORATION, Armonk, NY (US)

(72) Inventors: Cedric Lichtenau, Stuttgart (DE); Jonathan D. Bradbury, Poughkeepsie, NY (US); Eric M. Schwarz, Gardiner, NY (US); Razvan Peter Figuli, Remchingen (DE); Stefan Payer, Stuttgart (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/208,427

(22) Filed: Mar. 22, 2021

(65) Prior Publication Data

US 2021/0232638 A1    Jul. 29, 2021

Related U.S. Application Data

(63) Continuation of application No. 16/276,712, filed on Feb. 15, 2019, now Pat. No. 11,068,541.

(51) Int. Cl.
*G06F 7/00*       (2006.01)
*G06F 16/903*    (2019.01)
(Continued)

(52) U.S. Cl.
CPC ........ *G06F 16/90344* (2019.01); *G06F 17/16* (2013.01); *G06F 40/205* (2020.01)

(58) Field of Classification Search
CPC .. G06F 40/90344; G06F 40/205; G06F 17/16; G06F 16/90344
(Continued)

(56) References Cited

U.S. PATENT DOCUMENTS

| 6,047,283 A | 4/2000 | Braun |
| 8,676,955 B1 | 3/2014 | Masters et al. |

(Continued)

FOREIGN PATENT DOCUMENTS

| KR | 100481575 B1 * | 4/2005 |
| TW | 201403469 A | 1/2014 |
| TW | 201546633 A | 12/2015 |

OTHER PUBLICATIONS

Examination Report for AU Application No. 2020-221962, dated Feb. 4, 2022 (3 pages).

(Continued)

*Primary Examiner* — Md I Uddin
(74) *Attorney, Agent, or Firm* — Edward Wixted, Esq.; Kevin P. Radigan, Esq.; Heslin Rothenberg Farley & Mesiti P.C.

(57) ABSTRACT

An instruction is provided for performing a vector string search. The instruction to be processed is obtained, with the instruction being defined to be a string search instruction to locate occurrence of a substring within a string. The instruction is processed, with the processing including searching the string specified in one operand of the instruction using the substring specified in another operand of the instruction. Based on the searching locating a first full match of the substring within the string, a full match condition indication is returned with position of the first full match in the string, and based on the searching locating only a partial match of (Continued)

the substring at a termination of the string, a partial match condition indication is returned, with the position of the partial match in the string.

19 Claims, 10 Drawing Sheets

(51) Int. Cl.
   *G06F 40/205* (2020.01)
   *G06F 17/16* (2006.01)
(58) Field of Classification Search
   USPC .. 707/705, 737, 753, 758, 999.102, 999.005
   See application file for complete search history.

(56) References Cited

U.S. PATENT DOCUMENTS

| | | | |
|---|---|---|---|
| 9,268,567 | B2 | 2/2016 | Kuo |
| 9,454,367 | B2 | 9/2016 | Bradbury et al. |
| 10,169,451 | B1 | 1/2019 | Payer et al. |
| 10,896,469 | B1* | 1/2021 | Jenkins ............... G06Q 30/016 |
| 2014/0164352 | A1* | 6/2014 | Denninghoff ............ H03H 9/25 |
| | | | 707/711 |
| 2015/0356072 | A1 | 12/2015 | He et al. |
| 2018/0253300 | A1 | 9/2018 | Gschwind |

OTHER PUBLICATIONS

Mel et al., "The NIST Definition of Cloud Computing," National Institute of Standards and Technology, Information Technology Laboratory, Special Publication 800-145, Sep. 2011 (pp. 1-7).
International Business Machines Corporation (IBM), "Power ISA™ Version 2.07B," Apr. 9, 2015 (pp. 1-1527).
IBM Publication, "z/Architecture Principles of Operation," IBM® Publication No. SA22-7832-11, 12th Edition, Sep. 2017 (pp. 1-1902).
IBM Publication, "A Practical Algorithm for Frequent Substring Pattern Mining with Ternary Partitioning", Ip.com, Ip.com No. IPCOM000019354D, Sep. 12, 2003 (pp. 1-3).
IBM Publication, "Optimized search text engine in a monitoring context", Ip.com, Ip.com No. IPCOM000149889D, Apr. 12, 2007 (pp. 1-3).
Ehrman, John R., "Assembler Language Programming for IBM zSystem Servers—Version 2.00," Feb. 2016 (pp. 1-1346).
Tarhio et al., "Technology Beats Algorithms (in Exact String Matching)", ARXIV Org., Cornell University Library, arXiv: DOI: 10.1002/SPE.251, Dec. 5, 2016 (12 pages).
Lichtenau et al, "List of IBM Patents and/or Patent Applications Treated as Related", U.S. Appl. No. 17/208,427, filed Mar. 22, 2021, dated Mar. 22, 2021 (2 pages).
Examination Report for EP Application No. 20704524.6, dated Nov. 7, 2022 (6 pages).
Reply to Examination Report for EP Application No. 20704524.6, filed Feb. 21, 2023 (2 pages) (Year: 2023).
Notice of Acceptance for Patent Application for AU Patent Application No. 2020221962, dated Nov. 16, 2022 (3 pages).

\* cited by examiner

VECTOR STRING SEARCH

OBTAIN AN INSTRUCTION TO BE PROCESSED, THE INSTRUCTION DEFINED TO BE A STRING SEARCH INSTRUCTION TO LOCATE OCCURRENCE OF A SUBSTRING WITHIN A STRING ~600

PROCESS THE INSTRUCTION, THE PROCESSING INCLUDING ~602

SEARCHING THE STRING SPECIFIED IN ONE OPERAND OF THE INSTRUCTION USING THE SUBSTRING SPECIFIED IN ANOTHER OPERAND OF THE INSTRUCTION ~604

BASED ON THE SEARCHING LOCATING A FIRST FULL MATCH OF THE SUBSTRING WITHIN THE STRING, RETURNING A FULL MATCH CONDITION INDICATION WITH POSITION OF THE FIRST FULL MATCH IN THE STRING ~606

BASED ON THE SEARCHING LOCATING ONLY A PARTIAL MATCH OF THE SUBSTRING AT A TERMINATION OF THE STRING, RETURNING A PARTIAL MATCH CONDITION INDICATION WITH POSITION OF THE PARTIAL MATCH IN THE STRING ~608

WHERE THE PROCESSING FURTHER INCLUDES, BASED ON THE SEARCHING LOCATING NO MATCH OF THE SUBSTRING WITHIN THE STRING, RETURNING A NO MATCH CONDITION INDICATION WITH A SEARCH COMPLETION POSITION OF N, N BEING A LENGTH OF THE STRING IN BYTES ~610

FIG. 6A

WHERE THE PROCESSING FURTHER INCLUDES DETERMINING A MODE FOR THE SEARCHING, THE SEARCHING INCLUDING A NON-ZERO-TERMINATED SEARCH MODE AND A ZERO-TERMINATED SEARCH MODE, AND THE DETERMINING BEING BASED ON WHETHER A ZERO-SEARCH FLAG IN A FIELD OF THE INSTRUCTION IS SET TO INDICATE THAT THE STRING OR SUBSTRING CAN CONTAIN A ZERO TERMINATION THAT TRUNCATES THE STRING OR SUBSTRING, RESPECTIVELY, FOR THE SEARCHING ~ 612

WHERE THE PROCESSING FURTHER INCLUDES, BASED ON THE MODE FOR THE SEARCHING BEING THE ZERO-TERMINATED SEARCH MODE, DETERMINING THAT THE STRING INCLUDES THE ZERO TERMINATION, AND BASED THEREON, SETTING A ZERO-TERMINATION FOUND INDICATOR ~ 614

WHERE THE PROCESSING FURTHER INCLUDES, BASED ON THE SEARCHING REACHING THE ZERO TERMINATION WITHIN THE STRING WITHOUT A MATCH, TERMINATING THE SEARCHING AND RETURNING, WITH REFERENCE TO THE ZERO-TERMINATION FOUND INDICATOR, A NO MATCH WITH ZERO TERMINATION CONDITION INDICATION, WITH A SEARCH COMPLETION POSITION OF N, N BEING A LENGTH OF THE STRING IN BYTES ~ 616

WHERE THE DETERMINING FURTHER INCLUDES DETERMINING THAT A LENGTH OF THE STRING BEFORE THE ZERO TERMINATION WITHIN THE STRING IS SMALLER THAN THE SUBSTRING LENGTH, AND BASED THEREON, DETERMINING WHETHER A PORTION OF THE SUBSTRING MATCHES THE STRING BEFORE THE ZERO TERMINATION ~ 618

PROCEEDING WITH THE SEARCHING BASED ON A LENGTH OF THE SUBSTRING BEING A MULTIPLE OF A SIZE OF ELEMENTS WITHIN THE STRING, THE SIZE BEING DETERMINED FROM A FIELD OF THE INSTRUCTION ~ 620

WHERE THE SEARCHING IS BASED, IN PART, ON THE SIZE OF THE ELEMENTS WITHIN THE STRING, THE SEARCHING INCLUDING ELEMENT-BASED STEPPING THROUGH THE STRING, WHEREIN THE SIZE IS SELECTED FROM THE GROUP CONSISTING OF 1 BYTE, 2 BYTES, OR 4 BYTES ~ 622

WHERE THE STRING SEARCH INSTRUCTION IS AN ARCHITECTED HARDWARE MACHINE INSTRUCTION OF AN INSTRUCTION SET ARCHITECTURE ~ 624

WHERE THE ARCHITECTED HARDWARE MACHINE INSTRUCTION IS A VECTOR STRING SEARCH INSTRUCTION ~ 626

FIG. 6B

VECTOR STRING SEARCH INSTRUCTION

BACKGROUND

One or more aspects relate, in generate, to facilitating processing within a computing environment, and in particular, to facilitating processing associated with finding a substring within a string.

Finding a substring within a string is a common task in computer processing. For instance, in database queries, or in general in any text processing or parsing application, a facility to find a substring within a string may be employed. The basic approach is to check at every position for the substring. Unfortunately, this can be very inefficient, and bring a huge overhead to the process. Also, certain languages, such as C, have a concept of a zero terminating string, where a search should stop. This is generally handled with a supplementary test of the characters and a branch in the code, which results in additional processing overhead.

SUMMARY

Shortcomings of the prior art are overcome and additional advantages are provided through the provision of a computer program product for facilitating processing within a computing environment. The computer program product includes a computer-readable storage medium readable by a processing circuit and storing instructions for performing a method. The method includes obtaining an instruction to be processed, the instruction being a defined string search instruction to locate occurrence of a substring within a string. The method further includes processing the instruction. The processing includes searching the string specified in one operand of the instruction using the substring specified in another operand of the instruction. Based on the searching locating a first full match of the substring within the string, a full match condition indication is returned, along with position of the first full match in the string. Based on the searching locating only a partial match of the substring at a termination of the string, a partial match condition indication is returned, along with position of the partial match of the string. Advantageously, the string search instruction is a new string search instruction that can locate the first occurrence of a substring within a string and return its position, and can locate, if applicable, a partial match of the substring at a termination of the string, and return a partial match condition indication, along with position of the partial match in the string. The string search instruction can thus facilitate processing within a computing environment. Further, the string search instruction supports register-controlled length limitation to the search.

In one or more embodiments, the processing further includes, based on the searching locating no match of the substring within the string, returning a no-match condition indication with a search completion position of n, where n is a length of the string in bytes.

In one or more implementations, the processing further includes determining a mode for the searching, where the searching includes a non-zero-terminated search mode and a zero-terminated search mode. For instance, the determining can be based on whether a zero-search flag in a field of the instruction is set to indicate that the string or substring can contain a zero termination that terminates the string or substring, respectively, for the searching. Advantageously, the string search instruction disclosed can therefore support register-controlled length limitation, as well as zero-terminated string searching, for instance, via a modifier bit or mode flag in the instruction.

In one or more implementations, the processing further includes, based on the mode of the searching being the zero-terminated search mode, determining that the string includes the zero termination, and based thereon, setting a zero-termination found indicator. In one embodiment, the processing further includes, based on the searching reaching the zero termination within the string without a match, terminating the string and returning, with reference to the zero-termination found indicator, a no-match with zero-termination condition indication, with a search completion position of n, where n is a length of the string in bytes. Advantageously, condition indicators or codes can thus be returned to differentiate between a first full match found, a partial match found, and a no-match found, either with or without zero termination. Further, as noted, the string search instruction can be utilized with register-control length limitation, in conjunction with zero termination.

In one or more embodiments, the determining can further include determining that a length of the string before the zero-termination within the string is smaller than the length of the substring length. Based on the length being smaller, the determining includes determining whether a portion of the substring matches the string before the zero-termination.

In one or more implementations, the processing further includes proceeding with the searching based on a length of the substring being a multiple of the number of bytes of the elements within the string, where the number of bytes is determined from a field of the instruction. In one or more implementations, the searching is based, in part, on the number of bytes of the elements within the string, with the searching including element-based stepping through the string, and where the size of the elements is, for instance, 1 byte, 2 bytes, or 4 bytes per element.

In one or more embodiments, the string search instruction is an architected hardware machine instruction of an instruction set architecture. For instance, the architected hardware machine instruction is a vector string search instruction that facilitates processing within the computing environment.

Computer systems and computer-implemented methods relating to one or more aspects are also described and claimed herein. Further, services relating to one or more aspects are also described and may be claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIGS. 6A-6B depict one example of facilitating processing within a computing environment, in accordance with one or more aspects of the present invention;

DETAILED DESCRIPTION

In accordance with an aspect of the present invention, a capability is provided to facilitate processing within a computing environment. As one example, a single instruction (e.g., a single architected hardware machine instruction at the hardware/software interface) is provided to perform a function (also referred to as an operation), such as string search. The instruction is part of a general-purpose processor instruction set architecture (ISA), which is dispatched by a program (e.g., a user program) on the general-purpose processor. By using an ISA instruction to perform string search, execution time within a processor, such as a general-purpose processor, is reduced.

In one example, the string search instruction, when processing, searches the string specified in one operand of the instruction using the substring specified in another operand of the instruction. Based on the searching locating a first full match of the substring within the string, a full match condition indication is returned, along with position of the first full match in the string, and based on the searching locating only a partial match of the substring at a termination of the string, a partial match condition indication is returned, along with position of the partial match of the string.

In one or more implementations, the searching includes a non-zero-terminated search mode and a zero-terminated search mode, and the processing determines, based on whether a zero-search flag in a field of the instruction is set, whether the string can contain a zero termination. Based on the searching being in the zero-terminated search mode, and based on the searching reaching a zero termination within the string without a match, the searching is terminated and a no-match with zero-termination condition indication is returned, along with a search completion position of n, where n is a length of the string in bytes.

Figure 1A:
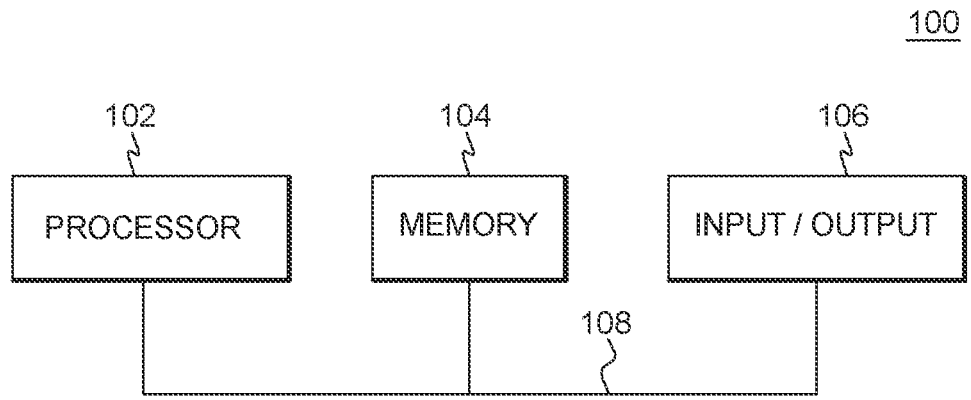
FIG. 1A depicts one example of a computing environment to incorporate and use one or more aspects of the present invention.

One embodiment of a computing environment to incorporate and use one or more aspects of the present invention is described with reference to FIG. 1A. A computing environment 100 includes, for instance, a processor 102 (e.g., a central processing unit), a memory 104 (e.g., main memory; a.k.a., system memory, main storage, central storage, storage), and one or more input/output (I/O) devices and/or interfaces 106 coupled to one another via, for example, one or more buses 108 and/or other connections.

In one example, processor 102 is based on the z/Architecture hardware architecture offered by International Business Machines Corporation, Armonk, N.Y., and is part of a server, such as an IBM Z° server, which is also offered by International Business Machines Corporation and implements the z/Architecture hardware architecture. One embodiment of the z/Architecture hardware architecture is described in a publication entitled, "z/Architecture Principles of Operation," IBM Publication No. SA22-7832-11, $12^{th}$ edition, September 2017, which is hereby incorporated herein by reference in its entirety. The z/Architecture hardware architecture, however, is only one example architecture; other architectures and/or other types of computing environments may include and/or use one or more aspects of the present invention. In one example, the processor executes an operating system, such as the z/OS® operating system, also offered by International Business Machines Corporation.

Figure 1B:
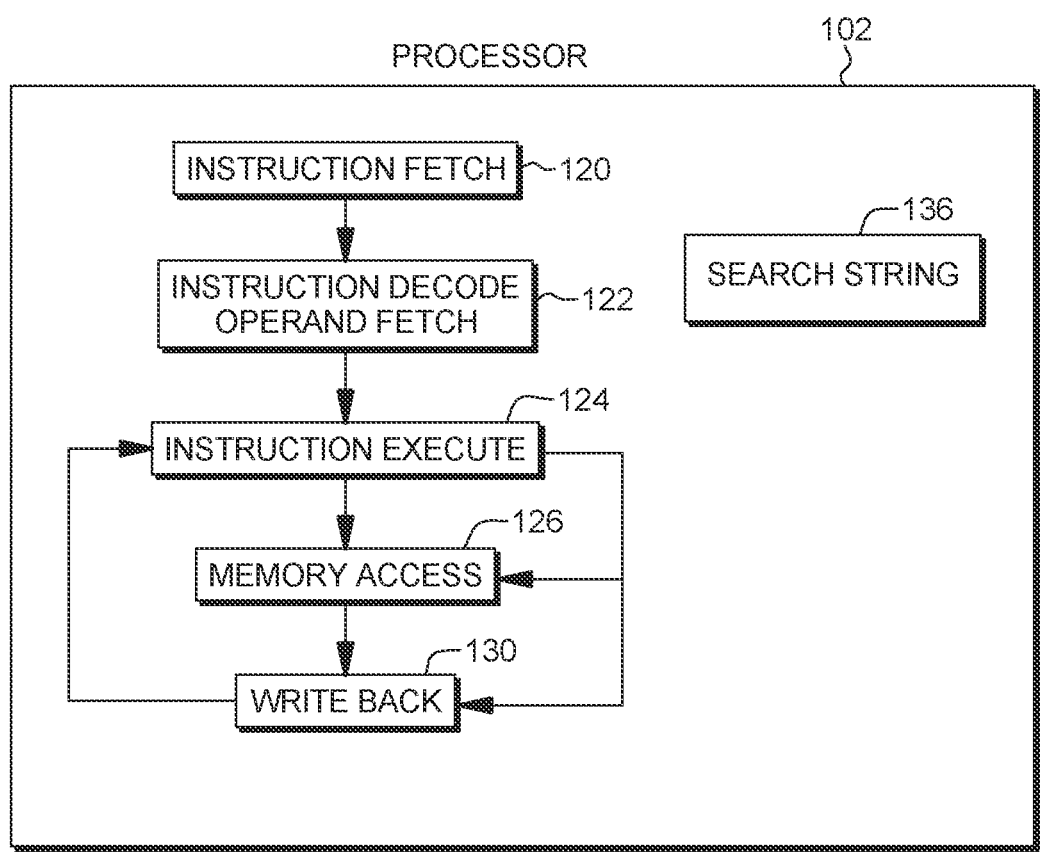
FIG. 1B depicts further details of a processor of FIG. 1A, in accordance with one or more aspects of the present invention.

Processor 102 includes a plurality of functional components used to execute instructions. As depicted in FIG. 1B, these functional components include, for instance, an instruction fetch component 120 to fetch instructions to be executed; an instruction decode unit 122 to decode the fetched instructions and to obtain operands of the decoded instructions; an instruction execute component 124 to execute the decoded instructions; a memory access component 126 to access memory for instruction execution, if necessary; and a write back component 130 to provide the results of the executed instructions. One or more of these components may, in accordance with one or more aspects of the present invention, include at least a portion of or have access to one or more other components used in string search processing, as described herein. The one or more other components include, for instance, search string component 136.

Another example of a computing environment to incorporate and use one or more aspects of the present invention is described with reference to FIG. 2. In one example, the computing environment is based on the z/Architecture hardware architecture; however, the computing environment may be based on other architectures offered by International Business Machines Corporation or others.

Figure 2:
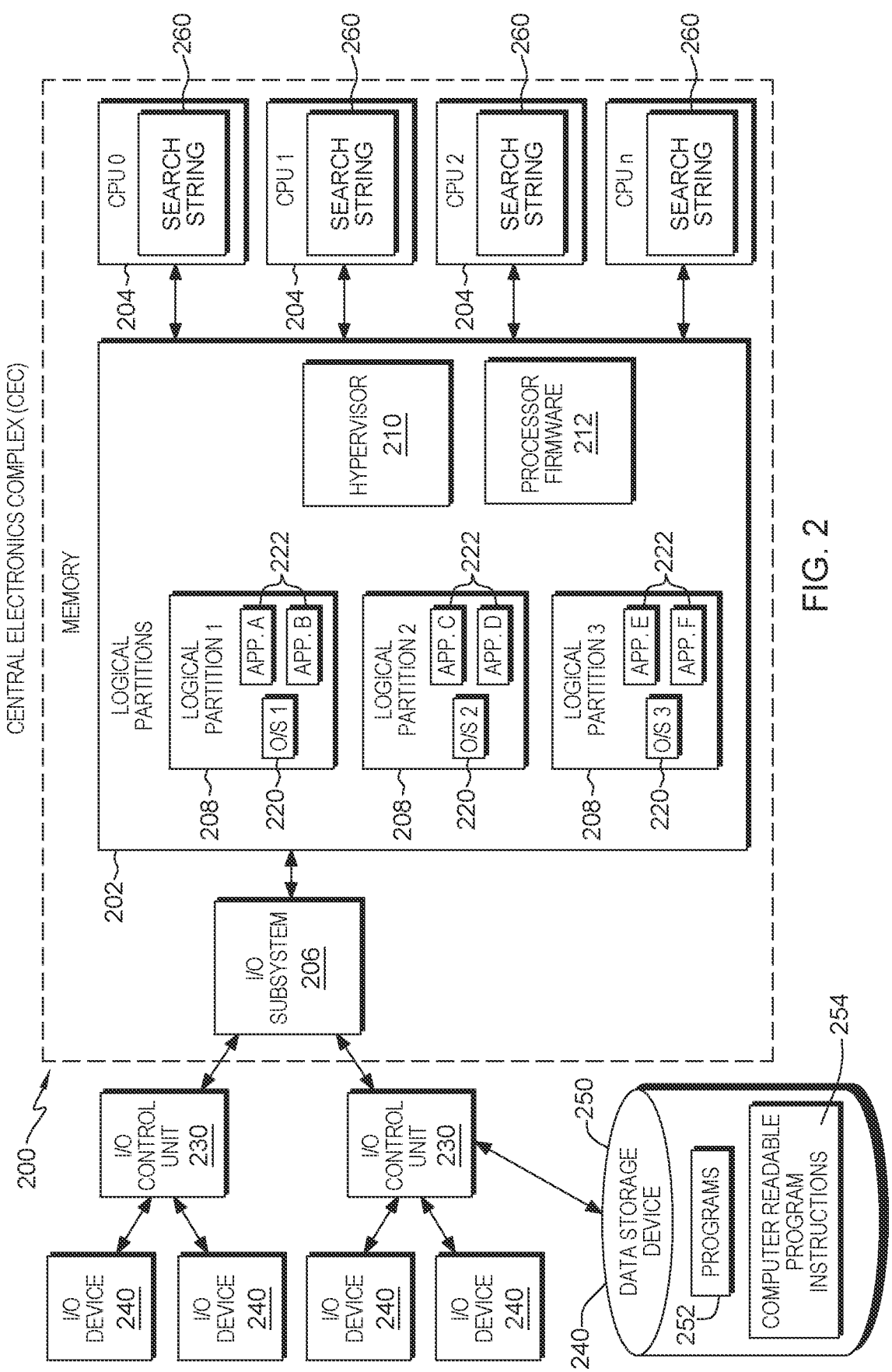
FIG. 2 depicts another example of a computing environment to incorporate and use one or more aspects of the present invention.

Referring to FIG. 2, in one example, the computing environment includes a central electronics complex (CEC) 200. CEC 200 includes a plurality of components, such as, for instance, a memory 202 (a.k.a., system memory, main memory, main storage, central storage, storage) coupled to one or more processors (a.k.a., central processing units (CPUs)) 204, and to an input/output subsystem 206.

Memory 202 includes, for example, one or more logical partitions 208, a hypervisor 210 that manages the logical partitions, and processor firmware 212. One example of hypervisor 210 is the Processor Resource/System Manager (PR/SM™) hypervisor, offered by International Business Machines Corporation, Armonk, N.Y. As used herein, firmware includes, e.g., the microcode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

Each logical partition 208 is capable of functioning as a separate system. That is, each logical partition can be independently reset, run a guest operating system 220 such as the z/OS operating system, or another operating system, and operate with different programs 222. An operating system or application program running in a logical partition appears to have access to a full and complete system, but in reality, only a portion of it is available.

Memory 202 is coupled to processors (e.g., CPUs) 204, which are physical processor resources that may be allocated to the logical partitions. For instance, a logical partition 208 includes one or more logical processors, each of which represents all or a share of a physical processor resource 204 that may be dynamically allocated to the logical partition. In one example, processor 204 includes search string component 260 to perform search processing, as described herein.

Further, memory 202 is coupled to I/O subsystem 206. I/O subsystem 206 may be a part of the central electronics complex or separate therefrom. It directs the flow of information between main storage 202 and input/output control units 230 and input/output (I/O) devices 240 coupled to the central electronics complex.

Many types of I/O devices may be used. One particular type is a data storage device 250. Data storage device 250 may store one or more programs 252, one or more computer readable program instructions 254, and/or data, etc. The computer readable program instructions may be configured to carry out functions of embodiments of aspects of the invention.

Computer readable program instructions configured to carry out functions of embodiments of aspects of the invention may also or alternatively be included in memory 202. Many variations are possible.

Central electronics complex 200 can include and/or be coupled to removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with central electronics complex 200. Examples include, but are not limited to: microcode, device drivers, redundant processing units, external disk drive arrays, RAID systems, tape drives, and data archival storage systems, etc.

Further, central electronics complex 200 can be operational with numerous other general purpose or special purpose computing system environments or configurations. Examples of well-known computing systems, environments, and/or configurations that may be suitable for use with central electronics complex 200 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Although various examples of computing environments are described herein, one or more aspects of the present invention may be used with many types of environments. The computing environments provided herein are only examples.

In accordance with an aspect of the present invention, a computing environment, such as computing environment 100 or central electronics complex (CEC) 200, executes an instruction to perform a string search. The instruction is, for instance, a vector string search instruction. In one or more embodiment, this instruction is part of a vector facility. The vector facility provides, for instance, fixed size vectors ranging from one to sixteen elements. Each vector includes data which is operated on by vector operations/instructions. In one embodiment, if a vector is made up of multiple elements, then each element is processed in parallel with the other elements. Instruction completion does not occur until processing of all of the elements is complete.

Vector data appears in storage, for instance, in the same left-to-right sequence as other data formats. Bits of a data format that are numbered 0-7 constitute the byte in the leftmost (lowest-numbered) byte location in storage, bits 8-15 form the byte in the next sequential location, and so on. In a further example, the vector data may appear in storage in another sequence, such as right-to-left.

Figure 3:
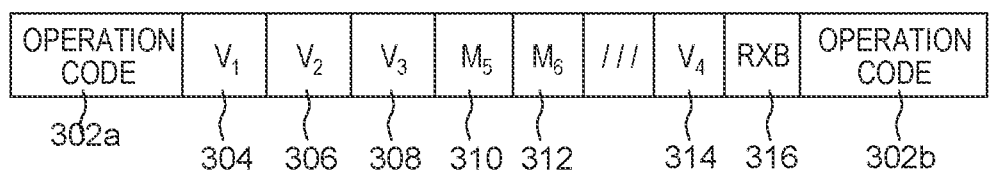
FIG. 3 depicts one example of a vector string search instruction for use in accordance with one or more aspects of the present invention.

By way of example, referring to FIG. 3, a Vector String Search (VSS) instruction 300 includes operation code fields 302a (e.g., bits 0-7), 302b (e.g., bits 40-47) indicating a Vector String Search operation; a first vector register field 304 (e.g., bits 8-11) used to designate a first vector register ($V_1$); a second vector register field 306 (e.g., bits 12-15) used to designate a second vector register ($V_2$); a third vector register field 308 (e.g., bits 16-19) used to designate a third vector register ($V_3$); a first mask field ($M_5$) 310 (e.g., bits 20-23); a second mask field ($M_6$) 312 (e.g., bits 24-27); a fourth vector register field 314 (e.g., bits 32-35) used to designate a fourth vector register ($V_4$); and an RXB field 316 (e.g., bits 36-39). Each of the fields 304-316, in one example, is separate and independent from the operational code field(s). Further, in one embodiment, they are separate and independent from one another; however, in other embodiments, more than one field may be combined. Further information on the use of these fields is described below.

In one example, the register extension bit or RXB, includes the most significant bit for each of the vector register designated operands. Bits for register designations not specified by the instruction are to be reserved and set to zero.

In one example, the RXB field includes four bits (e.g., bits 0-3), and the bits are defined as follows:
  0—Most significant bit for the first vector register designation of the instruction.
  1—Most significant bit for the second vector register designation of the instruction, if any.
  2—Most significant bit for the third vector register designation of the instruction, if any.
  3—Most significant bit for the fourth vector register designation of the instruction, if any.

Each bit is set to zero or one by, for instance, the assembler depending on the register number. For instance, for registers 0-15, the bit is set to 0, for registers 16-31, the bit is set to 1, etc.

In one embodiment, each RXB bit is an extension bit for a particular location in an instruction that includes one or more vector registers. For instance, in one or more vector instructions, bit 0 of RXB in an extension bit for location 8-11, which is assigned to e.g., $V_1$; bit 1 of RXB is an extension bit for location 12-15, which is assigned to e.g., $V_2$; and so forth.

In a further embodiment, the RXB field includes additional bits, and more than one bit is used as an extension for each vector or location.

Figure 4:
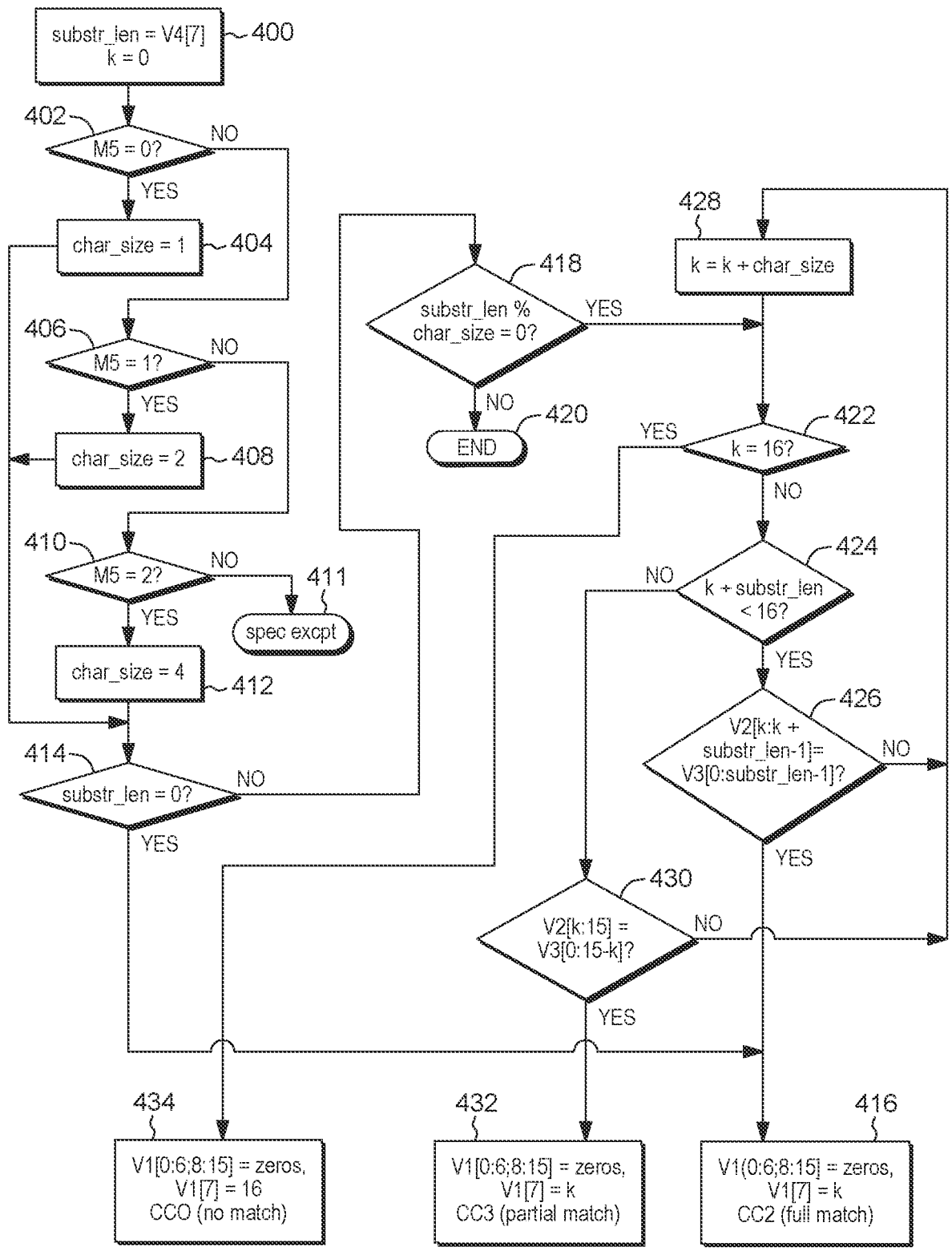
FIG. 4 depicts one embodiment of processing related to execution of a vector string search instruction, in accordance with one or more aspects of the present invention.
Figure 5:
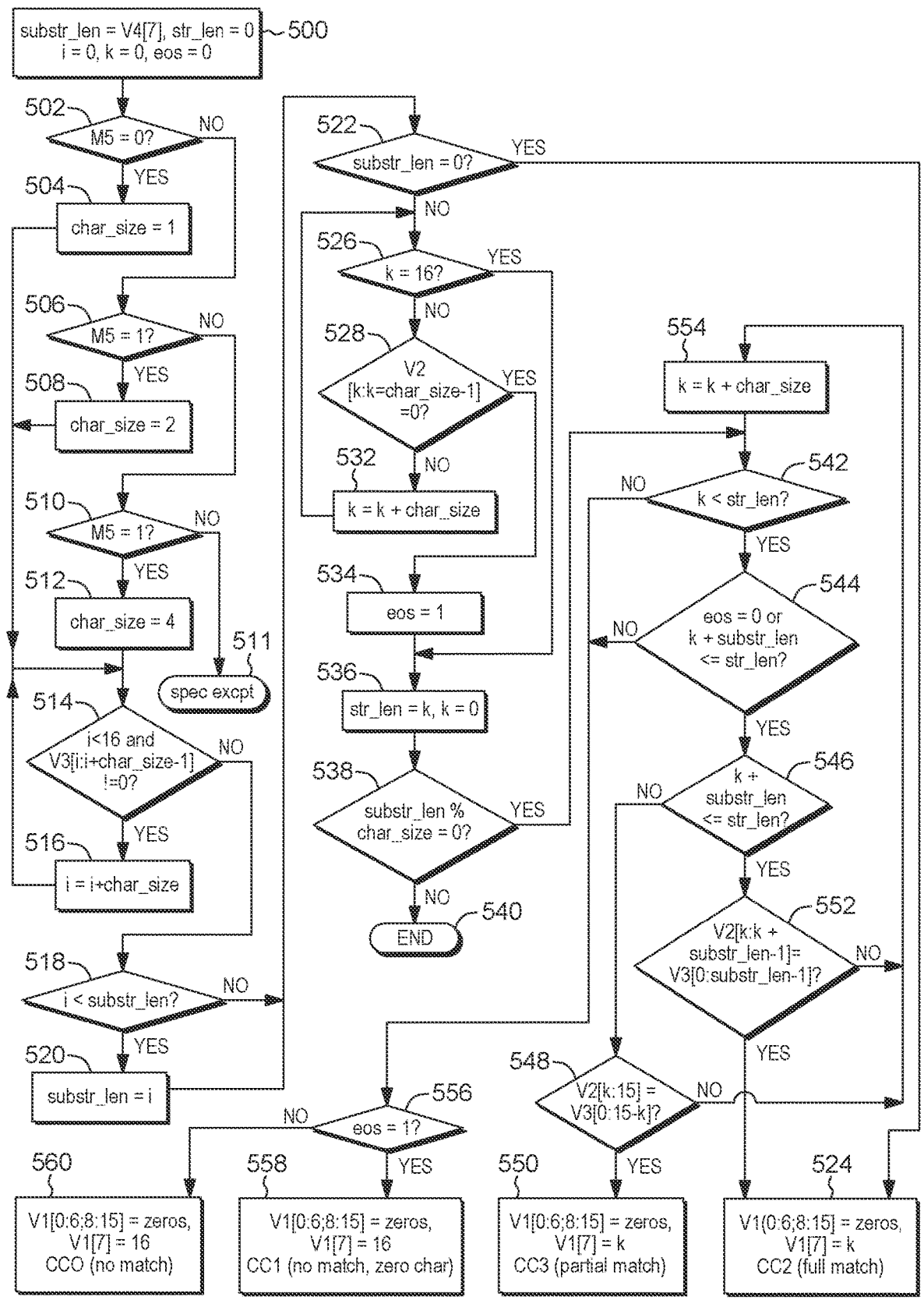
FIG. 5 depicts another embodiment of processing related to execution of a vector string search instruction, in accordance with one or more aspects of the present invention.

During processing of the instruction of FIG. 3, the substring specified in the third operand ($V_3$) is searched for in the string specified in the second operand ($V_2$). The length of the substring in the third operand ($V_3$) can be dependent on the zero-search (ZS) flag in the $M_6$ field. When the ZS flag is zero (indicative of a non-zero-terminated search mode), the length in bytes is specified as an unsigned binary integer in bits 56-63 of the fourth operand ($V_4$). When the ZS flag is one (indicative of a zero-terminated search mode), the length in bytes is specified by the smaller of, the unsigned binary integer in bits 56-63 of the fourth operand ($V_4$), and of the number of left-most bytes of the operand that contain non-zero values within elements (from zero to 16). Detailed embodiments of the non-zero-terminated process and zero-terminated process are depicted in FIGS. 4 & 5, respectively, and described below.

If the zero-search (ZS) flag in the $M_6$ field is one, and a zero element is contained in the third operand at a position less than the length specified by the fourth operand, then the position of the left-most byte of the zero element is used as the length of the substring. If the ZS flag is zero, then the length specified in the fourth operand is used. More particularly, if the zero-search flag in the $M_6$ field is 1, then the substring length is determined by the smallest of the fourth operand and the number of left-most non-zero byte(s) in the substring. If the zero-search flag is zero, then the substring length is determined by the fourth operand. Note that an effect of the zero-search flag being 1 is that the search string (in $V_2$) is "virtually" shortened from its full length to the number of left-most non-zero byte(s) in the search string, as explained herein.

A first intermediate result is computed at the left-most byte position in the second operand where the elements, left-to-right, of the substring are matching the elements in the second operand for the length of the substring. If such a position exists, then a full match exists. Otherwise, the longest partial string, left-to-right, of the substring matching the right-most elements of the second operand is computed as the intermediate result. If such a match is found, it is called a partial match. Otherwise, there is no-match, and the intermediate position result is n, where n is a length of the string in bytes (e.g., 16 in the example below).

If the zero-search (ZS) flag in the $M_6$ field is one, and the index of the first substring matching position is greater than the position of the left-most byte of the left-most zero element in the second operand, then the match is ignored. If a non-ignored match is found, then the starting position in bytes of the match in the second operand is stored in, for instance, byte element seven of the first operand ($V_1$), or else a value of 16 is stored. All other bytes of the first operand can be set to zero. Byte element 7 of the fourth operand ($V_4$) specifies the length of the substring in bytes, and is in the range of 0-16, in one or more embodiments.

The $M_5$ field specifies the size of the elements in the vector register operands. If a reserved value is specified, a specification exception is recognized. By way of example, $M_5$ could include a value zero, indicative of a 1-byte element size, a value 1, indicative of a 2-byte element size (half-word), or a value 2, indicative of a 4-byte element size (word). If the $M_5$ field specifies a half-word or word element size, and the length of the substring in bytes is not a multiple of this element size, then processing ends, or is adjusted to a proper element size multiple.

In one or more embodiments, the $M_6$ field can be a 4-bit field with bits 0, 1, and 3 reserved, and with bit 2 indicating a zero-terminated-search. If bit 2 is 1, then the position of the left-most 0 byte element marks the string length, that is, where the string includes a zero termination.

Example Resulting Condition Codes

0—No-match or partial match of the substring was found, and either the ZS flag is zero or no zero byte was detected in the second operand.

1—No-match of the substring was found, and the ZS flag is one and a zero byte was detected in the second operand.

2—A full match was found.

3—A partial match was found by no full match.

By way of further example, FIG. 4 depicts one embodiment of instruction processing in a non-zero-terminated search mode, in accordance with one or more aspects of the present invention. In the examples of FIGS. 4 & 5, Vx[y] denotes the y-th byte element of the x-th operand, V[i:k] denotes the concatenated bytes i through k of operand V, and M5 denotes the value of the $M_5$ field. The substring length is read via, for instance, the fourth vector register field, and the variable k is initialized to zero (substr_len=V4[7]; k=0) 400. The value of the first mask field ($M_5$) is obtained, and processing determines whether the value is zero, indicative of a 1-byte element size (M5=0?) 402. If "yes", then the number of bytes per element (or character) is saved to a char_size variable (char_size=1) 404. Assuming that $M_5$ does not contain a zero value, then processing determines whether it contains a 1 value (M5=1?) 406. If "yes", then the $M_5$ field is indicative of a 2-byte element size (half-word), and the char_size is set to 2 (char_size=2) 408. Otherwise, processing determines whether the $M_5$ field specifies a value 2 (M5=2?) 410, indicative of a 4-byte element size (word), and if so, char_size is set to 4 (char_size=4) 412. In one or more implementations, based on the $M_5$ field specifying a value other than 0, 1 or 2, an exception (spec excpt) 411 has occurred, and the search is handled by another approach than specified herein.

In one or more implementations, processing determines whether the substring length equals zero (substr_len=0?) 414. If so, then a special case is identified, where the search and match were determined using, for instance, a higher language process. Based on this indication, a full match condition indication (CC2 (full match)) 416 is returned.

Assuming that the substring length is greater than zero, processing determines whether the substring length is a multiple of the character size (substr_len % char_size=0?) 418, where % denotes the remainder of "substr_len" divided by "char_size". If there is a remainder, meaning that the substring length is not an integer multiple of the character size, then processing ends (end) 420, as a non-deterministic result is obtained.

Assuming that the substring length is a multiple of the element (or character) size, then a loop is entered testing the elements in the string to determine whether there is a match. Specifically, processing determines whether the variable k equals the total number of bytes in the string, with 16 being noted by way of example only (k=16?) 422. From the current position k in the string, the substring length is added and processing determines whether the combination is less than 16 (k+substr_len<=16?) 424. If "yes", then a search is made for the full length of the substring into the string (V2[k:k+substr_len−1]=V3[0:substr_len−1]?) 426, where V2[k:k+substr_len−1] denotes the concatenated bytes k through substr_len−1 of the string being compared against the substring specified in the third operand V3. If "yes", meaning that the substring matches the particular bytes in the string, then a full match condition indication is returned with position of the first full match in the string (V1[0:6; 8:15]=zeros; V1[7]=k; CC2 (full match)) 416, where (as noted) the full match condition indication can refer to, in one or more embodiments, a condition code 2 (CC2), and the first vector register is set with zeros, with bit 7 (in one example only) being set equal to k, to designate position of the first full match in the string.

Assuming that there is no match from inquiry 426, then processing increments the variable k with the element size (char_size) determined previously (k=k+char_size) 428. This results in a stepwise walking through the string based on element size.

Should k reach the end of the string, 16 in this example, without a match, then from inquiry (k=16?) 422, a no-match condition indication is returned, along with an element position of n, where n is the last byte in the string (V1[0:6; 8:15]=zeros, V1[7]=16; CC0 (no-match)) 434. By way of example, and as noted, the no-match condition indication could be a condition code 0 (CC0), and the position where left off in the search could be returned (by way of example only) as bit 7 of the first vector V1.

From inquiry (k+substr_len<=16?) 424, if the value of k+substr_len is not less than 16 424, then the substring will not fit any more into the elements of the string being searched into, and only a partial match is possible. Processing determines whether there is a partial match with the remaining portion of the string being searched (V2[k:15]=V3[0:15-k]?) 430. If "no", then processing loops back to increment k (k=k+char_size) 428 with the element size. If "yes", then a partial match is identified, and a partial match condition indication with position of the partial match in the string is returned (V1[0:6; 8:15]=zeros; V1[7]=k; CC3 (partial match)) 432. For instance, and as noted, a partial match condition code CC3 can be indicated, along with position of the partial match in the string.

FIG. 5 depicts one embodiment of instruction processing in a zero-terminated search mode, in accordance with one or more aspects of the present invention. In this example, the substring length is read, for instance, from the fourth vector register field, and the variables str_len, i, k, and eos are initialized to zero (substr_len=V4[7], str_len=0, i=0, k=0, eos=0) 500. The value of the first mask field ($M_5$) is obtained, and processing determines whether the value is zero, indicative of a 1-byte element size (M5=0?) 502. If "yes", then the number of bytes per element (or character) is saved to a char_size variable (char_size=1) 504. Assuming that $M_5$ does not contain a zero value, then processing determines whether it contains a 1 value (M5=1?) 506. If "yes", then the $M_5$ field is indicative of a 2-byte element size (half-word), and the char_size is set to 2 (char_size=2) 508. Otherwise, processing determines whether the $M_5$ field specifies a value 2 (M5=2?) 510, indicate of a 4-byte element size (word), and if so, char_size is set to 4 (char_size=4) 512. In one or more implementations, based on the $M_5$ specifying a value other than 0, 1 or 2, an exception (spec excpt) 511 has occurred, and the search is handled by another approach than specified herein.

In one or more implementations, processing determines whether the substring include a zero termination (i<16 and V3[i:i+char_size-1]!=0) 514, where valid values for i are multiple integers of character size. The process increments until a zero character is identified or, for instance, i=16 in this example (i=i+char_size) 516. A determination is made whether a zero-termination with location i is found in the substring at a position less than a length of the substring (i<substr_len?) 518. If "yes", then the substring length is changed to equal i (substr_len=i) 520.

In one or more implementations, processing determines whether the substring length equals zero (substr_len=0?) 522. If so, then a special case is identified, where the search and match were determined using, for instance, a higher language process. Based on this indication, a full match condition indication (CC2 (full match)) 524 is returned.

Assuming that the substring length is greater than zero, processing determines whether the variable k=16 (in this example) (k=16?) 526. Assuming "no", then processing determines whether a zero termination is found in the string (V2[k:k=char_size-1]=0?) 528. If "no", then the variable k is incremented by the element size (k=k+char_size) 532, and the process repeats. Assuming that a zero-termination is found in the string, then the variable eos is set (eos=1) 534, and the string length variable is set to location k, where the zero termination is located (str_len=k, k=0) 536.

In one or more embodiments, processing determines whether the substring length is a multiple of the character size (substr_len % char_size 0?) 538, where % denotes the remainder of "substr_len" divided by "char_size". If there is a remainder, meaning that the substring length is not an integer multiple of the character size, then the processing ends (end) 540, as a non-deterministic result is obtained.

Assuming that the substring length is a multiple of the element (or character) size, then a loop is entered, testing the elements in the string to determine whether there is a match. Specifically, processing determines whether the variable k is less than the string length (k<str_len?) 542. Assuming so, processing determines whether the variable eos equals zero, or the current position k plus the length of the substring is less than or equal to the string length (eos=0 or k+substr_len<=str_len?) 544. If "yes", then processing determines whether a current position k plus the substring length is less than or equal to the string length (k+substr+len<=str_len?) 546. If "yes", then a search is made for the full length of the substring into the string (V2[k:k+substr_len-1]=V3[0:substr_len-1]?) 552. If "yes", meaning that the substring matches the particular bytes in the string, then a full match condition indication is returned with position of the first full match in the string (V1[0:6; 8:15]=zeros, V1[7]=k, CC2 (full match)) 524. Note that the position is returned, in one example, with the first vector register being set to all zeros, except for, for instance, byte 7 being equal to k, to designate position or offset of the first full match in the string.

Assuming no-match from inquiry 552, then processing increments the variable k with the element size (char_size) determined previously (k=k+char_size) 554.

From inquiry 546, should k plus the substring length being greater than the string length remaining, then processing looks for a partial match of the substring at the termination of the string (V2[k:15]=V3[0:15-k]?) 548. If there is a partial match, then a partial match condition indication is returned with position of the partial match in the string (V1[0:6; 8:15]=zeros, V1[7]=k, CC3 (partial match)) 550.

Should k reach the end of the string (inquiry 542), or from inquiry 544, should the end of string variable (eos) be other than zero, and k+substr_len be greater than the string length 544, then processing determines whether the end of string variable is set (eos=1?) 556. If "no", then a no-match condition indication is returned, along with an element position of n, where n is a length of the string in bytes (16 in this example) (V1[0:6; 8:15]=zeros, V1[7]=16, CC0 (no-match)) 560. Otherwise, a no-match with zero-termination condition indication is returned, along with an element position of n (V1[0:6; 8:15]=zeros, V1[7]=16, CC1 (no match, zero char)) 558.

Further details of one embodiment of facilitating processing within a computing environment, as it relates to one or more aspects of the present invention, are described with reference to FIGS. 6A-6B.

Referring to FIG. 6A, in one embodiment an instruction to be processed is obtained, where the instruction is defined to be string search instruction to locate occurrence of a substring within a string (600). The instruction is executed on a processor of the computing environment (602), and based on executing the instruction, processing searches the string specified in one operand of the instruction using the substring specified in another operand of the instruction (604). Based on the searching locating a first full match of the substring within the string, a full match condition indication is returned, along with position of the first full match in the string (606). Based on the searching locating only a partial match of the substring at a termination of the string, a partial match condition indication with position of the partial match of the string is returned (608).

In one or more implementations, the processing further includes, based on the searching locating no match of the substring within the string, a no-match condition indication is returned, along with a search completion position indication of n, where n is a length of the string in bytes (610).

Referring to FIG. 6B, in one or more implementations, the processing further includes determining a mode for the searching, where the searching includes a non-zero-terminated search mode and a zero-terminated search mode, and the determining is based on whether a zero-search flag in a field of the instruction is set to indicate that the string or substring can contain a zero termination that truncates the string or substring, respectively, for the searching (612). For instance, the processing includes, based on the mode of searching being a zero-terminated search mode, determining that the string includes a zero termination, and based thereon, setting a zero-termination found indicator (614). Further, the processing can include, based on the searching reaching the zero-termination within the string without a match, terminating the string and returning, with reference to the zero-termination found indicator, a no-match with zero-termination condition indication, along with a search completion position of n, where n is a length of the string in bytes (616).

In one or more implementations, the determining can further include determining that a length of the string before the zero termination within the string is smaller than the substring length, and based thereon, determining whether a portion of the substring matches the string before the zero termination (618).

In one embodiment, the searching can proceed, based on a length of the substring being a multiple of a size of elements within the string, where the size is determined from the field of the instruction (620). Further, the searching can be based, in part, on the size of the elements within the string, with the searching including an element-based stepping through the string, where the size can be 1 byte, 2 bytes, or 4 bytes (622).

In one or more embodiments, the string search instruction is an architected hardware machine instructions of an instruction set architecture (624). For instance, the architected hardware machine instruction can be a vector string search instruction (626).

Other variations and embodiments are possible.

Figure 7A:
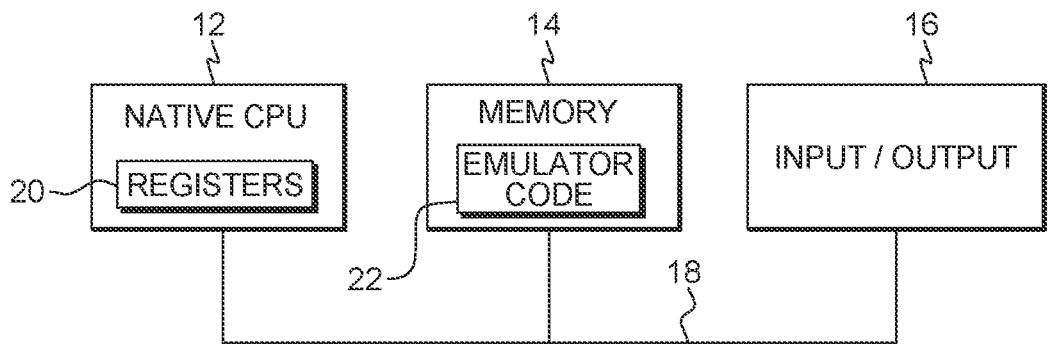
FIG. 7A depicts another example of a computing environment to incorporate and use one or more aspects of the present invention.

Aspects of the present invention may be used by many types of computing environments. Another embodiment of a computing environment to incorporate and use one or more aspects of the present invention is described with reference to FIG. 7A. In this example, a computing environment 10 includes, for instance, a native central processing unit (CPU) 12, a memory 14, and one or more input/output devices and/or interfaces 16 coupled to one another via, for example, one or more buses 18 and/or other connections. As examples, computing environment 10 may include a PowerPC® processor offered by International Business Machines Corporation, Armonk, N.Y.; an HP Superdome with Intel Itanium II processors offered by Hewlett Packard Co., Palo Alto, Calif.; and/or other machines based on architectures offered by International Business Machines Corporation, Hewlett Packard, Intel Corporation, Oracle, or others. IBM, z/Architecture, IBM Z, z/OS, PR/SM and PowerPC are trademarks or registered trademarks of International Business Machines Corporation in at least one jurisdiction. Intel and Itanium are trademarks or registered trademarks of Intel Corporation or its subsidiaries in the United States and other countries.

Native central processing unit 12 includes one or more native registers 20, such as one or more general purpose registers and/or one or more special purpose registers used during processing within the environment. These registers include information that represents the state of the environment at any particular point in time.

Moreover, native central processing unit 12 executes instructions and code that are stored in memory 14. In one particular example, the central processing unit executes emulator code 22 stored in memory 14. This code enables the computing environment configured in one architecture to emulate another architecture. For instance, emulator code 22 allows machines based on architectures other than the z/Architecture hardware architecture, such as PowerPC processors, HP Superdome servers or others, to emulate the z/Architecture hardware architecture and to execute software and instructions developed based on the z/Architecture hardware architecture.

Figure 7B:
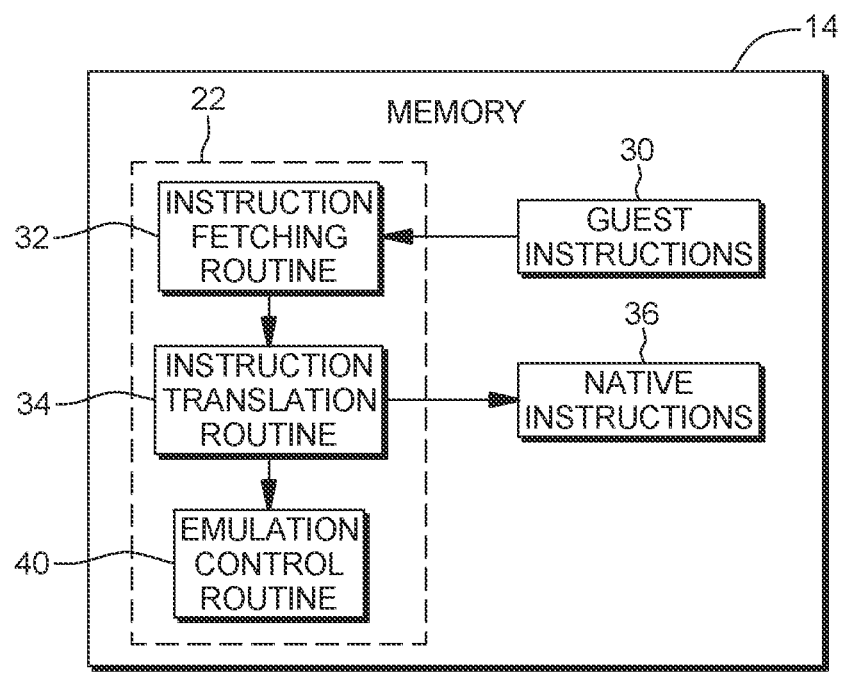
FIG. 7B depicts further details of the memory of FIG. 7A, in accordance with one or more aspects of the present invention.

Further details relating to emulator code 22 are described with reference to FIG. 7B. Guest instructions 30 stored in memory 14 comprise software instructions (e.g., correlating to machine instructions) that were developed to be executed in an architecture other than that of native CPU 12. For example, guest instructions 30 may have been designed to execute on a processor based on the z/Architecture hardware architecture, but instead, are being emulated on native CPU 12, which may be, for example, an Intel Itanium II processor. In one example, emulator code 22 includes an instruction fetching routine 32 to obtain one or more guest instructions 30 from memory 14, and to optionally provide local buffering for the instructions obtained. It also includes an instruction translation routine 34 to determine the type of guest instruction that has been obtained and to translate the guest instruction into one or more corresponding native instructions 36. This translation includes, for instance, identifying the function to be performed by the guest instruction and choosing the native instruction(s) to perform that function.

Further, emulator code 22 includes an emulation control routine 40 to cause the native instructions to be executed. Emulation control routine 40 may cause native CPU 12 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 36 may include loading data into a register from memory 14; storing data back to memory from a register; or performing some type of arithmetic or logic operation, as determined by the translation routine.

Each routine is, for instance, implemented in software, which is stored in memory and executed by native central processing unit 12. In other examples, one or more of the routines or operations are implemented in firmware, hardware, software or some combination thereof. The registers of the emulated processor may be emulated using registers 20 of the native CPU or by using locations in memory 14. In embodiments, guest instructions 30, native instructions 36 and emulator code 22 may reside in the same memory or may be disbursed among different memory devices.

The computing environments described above are only examples of computing environments that can be used. Other environments, including but not limited to, non-partitioned environments, partitioned environments, and/or emulated environments, may be used; embodiments are not limited to any one environment.

Each computing environment is capable of being configured to include one or more aspects of the present invention. For instance, each may be configured to provide overflow processing, in accordance with one or more aspects of the present invention.

One or more aspects may relate to cloud computing.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
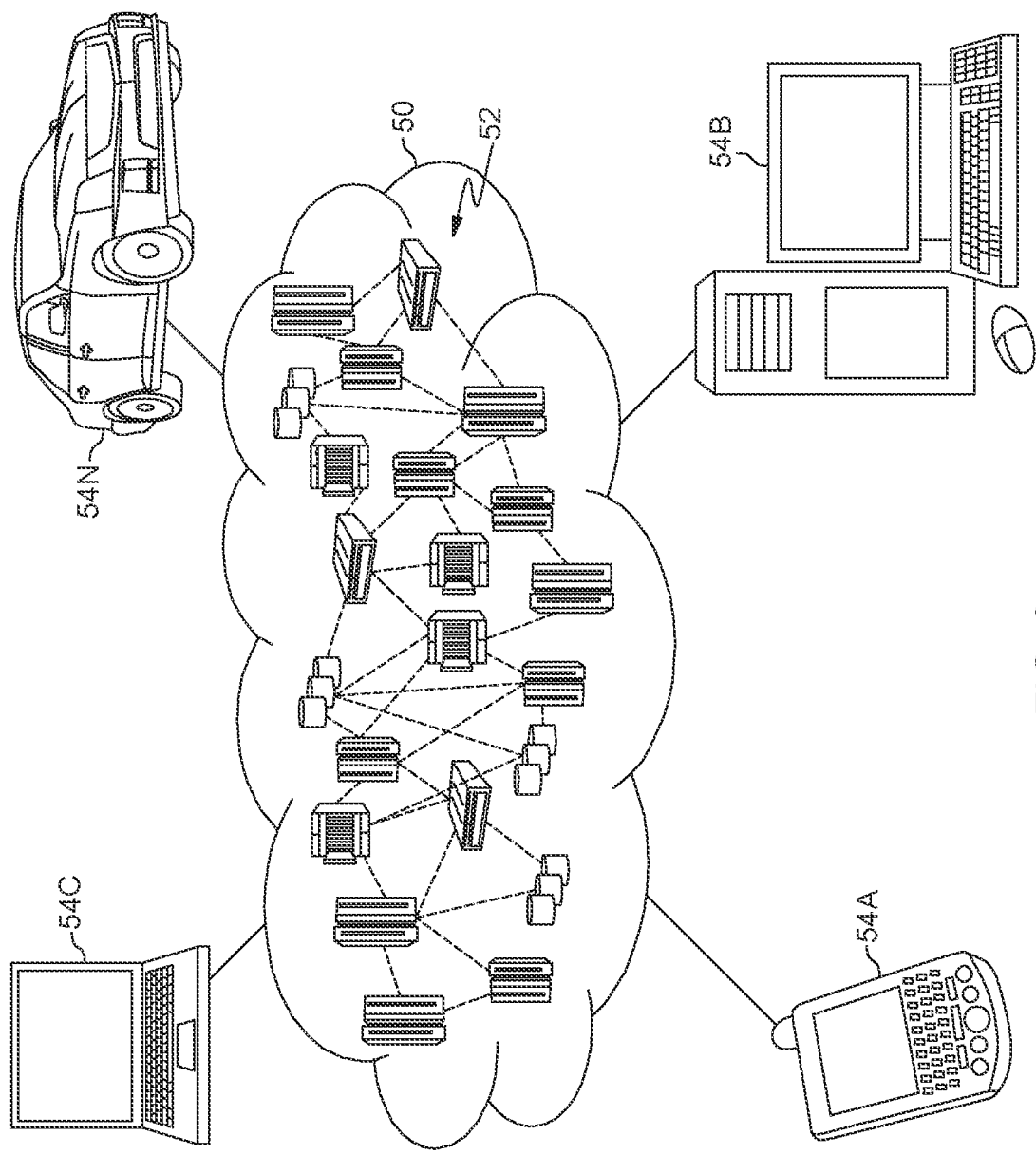
FIG. 8 depicts one embodiment of a cloud computing environment.

Referring now to FIG. 8, illustrative cloud computing environment 50 is depicted. As shown, cloud computing environment 50 includes one or more cloud computing nodes 52 with which local computing devices used by cloud consumers, such as, for example, personal digital assistant (PDA) or cellular telephone 54A, desktop computer 54B, laptop computer 54C, and/or automobile computer system 54N may communicate. Nodes 52 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 52 and cloud computing environment 50 can communicate with any type of computerized device over any type of network and/or network addressable connection (e.g., using a web browser).

Figure 9:
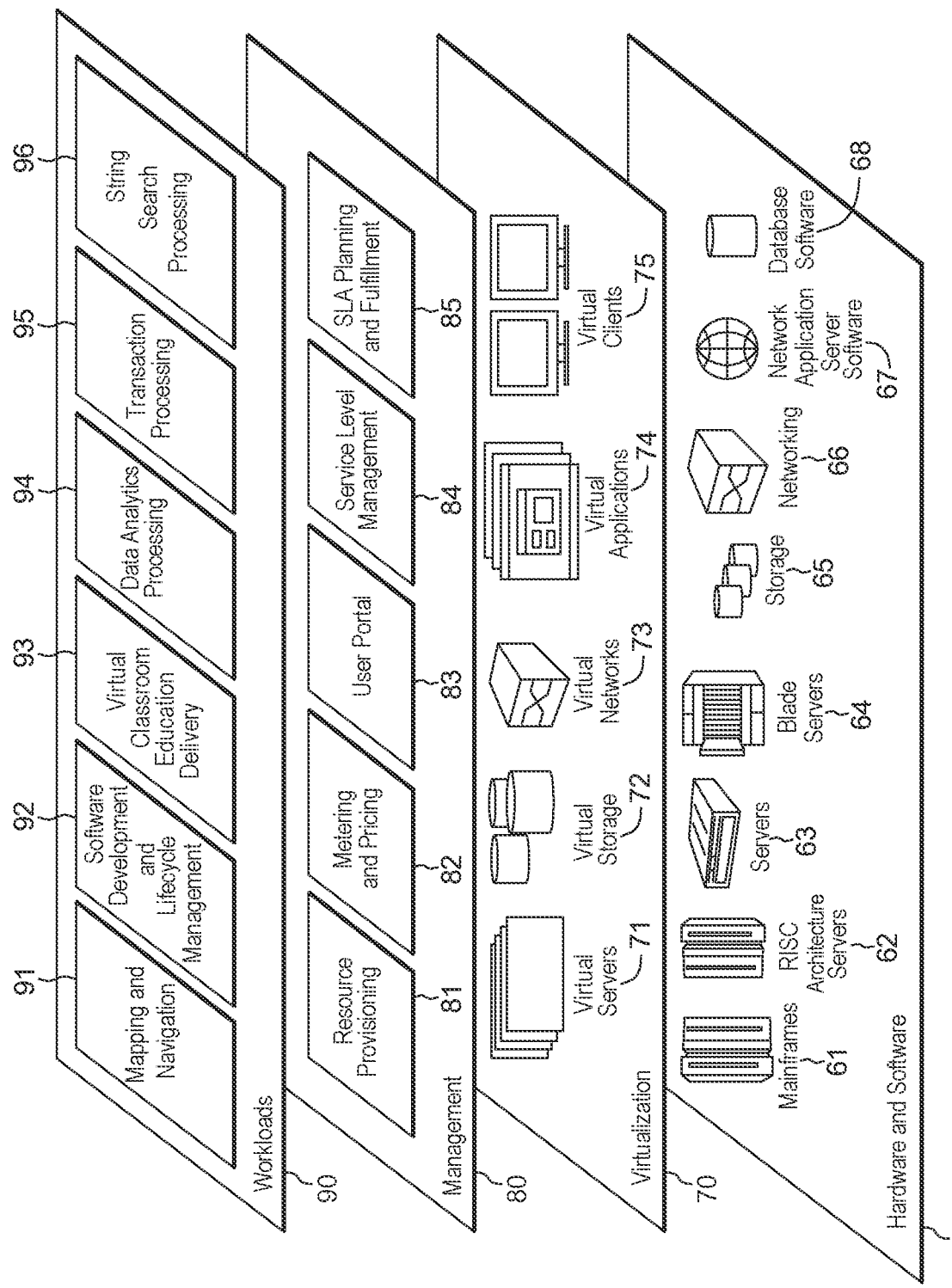
FIG. 9 depicts one example of abstraction model layers.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and string search processing 96.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally, or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions or operations may be used. Additionally, different types of indicators may be specified. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing within a computing environment, the computer program product comprising:

a computer-readable storage medium readable by a processing circuit and storing instructions for performing a method comprising:

obtaining an instruction to be processed of the stored instructions, the instruction defined to be a vector string search instruction to locate occurrence of a substring within a string, the string and sub-string being specified in respective operands of the instruction;

processing the instruction, the processing comprising:

determining from the instruction a search mode of multiple different search modes for searching the string for the sub-string, the multiple different search modes including a non-zero-terminated search mode and a zero-terminated search mode, and the determining being based on whether a zero-search flag in a field of the instruction is set to indicate the zero-terminated search mode, wherein in the zero-terminated search mode, the string or substring can contain a zero termination that shortens for the searching the string or substring, respectively, the shortening being in comparison to a respective length of the string or substring in the non-zero-terminated search mode;

searching the string specified in one operand of the instruction using the substring specified in another operand of the instruction;

based on the searching locating a first full match of the substring within the string, returning a full match condition indication with position of the first full match in the string; and based on the searching locating only a partial match of the substring at a termination of the string, returning a partial match condition indication with position of the partial match in the string.

2. The computer program product of claim 1, wherein the processing further comprises, based on the searching locating no-match of the substring within the string, returning a no-match condition indication with a search completion position of n, n being a length of the string in bytes.

3. The computer program product of claim 1, wherein the processing further comprises, based on the mode for the searching being the zero-terminated search mode, determining that the string includes the zero termination, and based thereon, setting a zero-termination found indicator.

4. The computer program product of claim 3, wherein the processing further comprises, based on the searching reaching the zero termination within the string without a match, terminating the searching and returning, with reference to the zero-termination found indicator, a no-match with zero termination condition indication, with a search completion position of n, n being a length of the string in bytes.

5. The computer program product of claim 3, wherein the determining further comprises determining that a length of the string before the zero termination within the string is smaller than the substring length, and based thereon, determining whether a portion of the substring matches the string before the zero termination.

6. The computer program product of claim 1, wherein the string search instruction is an architected hardware machine instruction of an instruction set architecture.

7. The computer program product of claim 6, wherein the architected hardware machine instruction is a vector string search instruction.

8. A computer system for facilitating processing within a computing environment, the computer system comprising:

a memory; and a processor coupled to the memory, wherein the computer system is configured to perform a method comprising:

obtaining an instruction to be processed of the stored instructions, the instruction defined to be a vector string search instruction to locate occurrence of a substring within a string, the string and sub-string being specified in respective operands of the instruction;

processing the instruction, the processing comprising:

determining from the instruction a search mode of multiple different search modes for searching the string for the sub-string, the multiple different search modes including a non-zero-terminated search mode and a zero-terminated search mode, and the determining being based on whether a zero-search flag in a field of the instruction is set to indicate the zero-terminated search mode, wherein in the zero-terminated search mode, the string or substring can contain a zero termination that shortens for the searching the string or substring, respectively, the shortening being in comparison to a respective length of the string or substring in the non-zero-terminated search mode;

searching the string specified in one operand of the instruction using the substring specified in another operand of the instruction;

based on the searching locating a first full match of the substring within the string, returning a full match condition indication with position of the first full match in the string; and based on the searching locating only a partial match of the substring at a termination of the string, returning a partial match condition indication with position of the partial match in the string.

9. The computer system of claim 8, wherein the processing further comprises, based on the searching locating no-match of the substring within the string, returning a no-match condition indication with a search completion position of n, n being a length of the string in bytes.

10. The computer system of claim 8, wherein the processing further comprises, based on the mode for the searching being the zero-terminated search mode, determining that the string includes the zero termination, and based thereon, setting a zero-termination found indicator.

11. The computer system of claim 10, wherein the processing further comprises, based on the searching reaching the zero termination within the string without a match, terminating the searching and returning, with reference to the zero-termination found indicator, a no-match with zero termination condition indication, with a search completion position of n, n being a length of the string in bytes.

12. The computer system of claim 10, wherein the determining further comprises determining that a length of the string before the zero termination within the string is smaller than the substring length, and based thereon, determining whether a portion of the substring matches the string before the zero termination.

13. A computer-implemented method of facilitating processing within a computing environment, the computer-implemented method comprising:

obtaining an instruction to be processed of the stored instructions, the instruction defined to be a vector string search instruction to locate occurrence of a sub string within a string, the string and sub-string being specified in respective operands of the instruction;

processing the instruction, the processing comprising:

determining from the instruction a search mode of multiple different search modes for searching the string for the sub-string, the multiple different search modes including a non-zero-terminated search mode and a zero-terminated search mode, and the determining being based on whether a zero-search flag in a field of the instruction is set to indicate the zero-terminated search mode, wherein in the zero-terminated search mode, the string or substring can contain a zero termination that shortens for the searching the string or substring, respectively, the shortening being in comparison to a respective length of the string or substring in the non-zero-terminated search mode;

searching the string specified in one operand of the instruction using the substring specified in another operand of the instruction;

based on the searching locating a first full match of the substring within the string, returning a full match condition indication with position of the first full match in the string; and based on the searching locating only a partial match of the substring at a termination of the string, returning a partial match condition indication with position of the partial match in the string.

14. The computer-implemented method of claim 13, wherein the processing further comprises, based on the searching locating no-match of the substring within the string, returning a no-match condition indication with a search completion position of n, n being a length of the string in bytes.

15. The computer-implemented method of claim 13, wherein the processing further comprises, based on the mode for the searching being the zero-terminated search mode, determining that the string includes the zero termination, and based thereon, setting a zero-termination found indicator.

16. The computer-implemented method of claim 15, wherein the processing further comprises, based on the searching reaching the zero termination within the string without a match, terminating the searching and returning, with reference to the zero-termination found indicator, a no-match with zero termination condition indication, with a search completion position of n, n being a length of the string in bytes.

17. The computer-implemented method of claim 15, wherein the determining further comprises determining that a length of the string before the zero termination within the string is smaller than the substring length, and based thereon, determining whether a portion of the substring matches the string before the zero termination.

18. The computer-implemented method of claim 13, wherein the string search instruction is an architected hardware machine instruction of an instruction set architecture.

19. The computer-implemented method of claim 18, wherein the architected hardware machine instruction is a vector string search instruction.

* * * * *